United States Patent
Haag et al.

(10) Patent No.: US 10,273,429 B2
(45) Date of Patent: Apr. 30, 2019

(54) LUBRICANT FOR ROLLER BEARINGS, ROLLER BEARING AND METHOD FOR PRODUCTION AND REPAIR OF ROLLER BEARINGS

(71) Applicant: Aktiebolaget SKF, Gothenburg (SE)

(72) Inventors: Cornelia Haag, Aubstadt (DE); Yvonne Koehler, Schonungen (DE); Kerstin Korbacher, Wipfeld (DE); Verena Kunkel, Gochsheim (DE); Franziska Mantei, Triefenstein (DE); Ilim Topaloglu, Schweinfurt (DE); Marion Warmuth, Hambach (DE)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 15/504,105

(22) PCT Filed: Aug. 4, 2015

(86) PCT No.: PCT/EP2015/067914
§ 371 (c)(1),
(2) Date: Feb. 15, 2017

(87) PCT Pub. No.: WO2016/026686
PCT Pub. Date: Feb. 25, 2016

(65) Prior Publication Data
US 2017/0275550 A1   Sep. 28, 2017

(30) Foreign Application Priority Data

Aug. 22, 2014 (DE) .................. 10 2014 216 691

(51) Int. Cl.
*F16C 19/52* (2006.01)
*F16C 25/06* (2006.01)
(Continued)

(52) U.S. Cl.
CPC .......... *C10M 125/26* (2013.01); *F16C 25/06* (2013.01); *F16C 33/6633* (2013.01);
(Continued)

(58) Field of Classification Search
CPC ............. F16C 33/6688; F16C 2231/00; C10N 2230/06; C10N 2240/02; C10M 2201/103
See application file for complete search history.

(56) References Cited

U.S. PATENT DOCUMENTS

| | | |
|---|---|---|
| 4,402,838 A | 9/1983 | Eguchi et al. |
| 4,532,055 A | 7/1985 | Eguchi et al. |

(Continued)

FOREIGN PATENT DOCUMENTS

| | | |
|---|---|---|
| DE | 10082139 T1 | 10/2001 |
| DE | 102004063835 A1 | 7/2006 |

(Continued)

OTHER PUBLICATIONS

Oki et al., JP Publication No. 2012-251616, Multi-Layered bearing, Thrust Multi-Layered Bearing, and Thrust Multi-Layered Bearing Device, Dec. 20, 2012.*

(Continued)

*Primary Examiner* — Vishal V Vasisth
(74) *Attorney, Agent, or Firm* — Bryan Peckjian; SKF USA Inc. Patent Dept.

(57) ABSTRACT

A lubricant for a rolling-element bearing includes a conventional lubricant as a base lubricant and at least one first additive, wherein the first additive includes muscovite, and the lubricant includes a proportion of muscovite that is between 3% and 5%. Also a method of lubricating a rolling-element bearing using the lubricant and a method of repairing a rolling-element bearing using the lubricant.

8 Claims, 3 Drawing Sheets

(51) Int. Cl.
*F16C 33/64* (2006.01)
*F16C 33/66* (2006.01)
*C10M 125/26* (2006.01)

(52) U.S. Cl.
CPC ... *F16C 33/6688* (2013.01); *C10M 2201/103* (2013.01); *C10N 2230/06* (2013.01); *C10N 2240/02* (2013.01); *C10N 2270/00* (2013.01); *F16C 19/52* (2013.01); *F16C 33/64* (2013.01); *F16C 2231/00* (2013.01); *F16C 2237/00* (2013.01); *F16C 2240/54* (2013.01)

(56) References Cited

U.S. PATENT DOCUMENTS

| | | |
|---|---|---|
| 2004/0198891 A1 | 10/2004 | Underwood |
| 2010/0021097 A1* | 1/2010 | Uchida ............ B65G 39/09 384/492 |
| 2011/0044572 A1 | 2/2011 | Kano et al. |

FOREIGN PATENT DOCUMENTS

| | | | |
|---|---|---|---|
| JP | 2003313573 A | | 11/2003 |
| JP | 2012251616 A | * | 12/2012 |
| RU | 2004137941 A | | 6/2006 |

OTHER PUBLICATIONS

Thomson Scientific; Databas WPI Week 200671 Thomson Scientific, London, Gb, AN 2006-685804, XP002750648 Oct. 6, 2006.

* cited by examiner

LUBRICANT FOR ROLLER BEARINGS, ROLLER BEARING AND METHOD FOR PRODUCTION AND REPAIR OF ROLLER BEARINGS

This application is a 371 of PCT/EP2015/067914, filed Ser. No. 08/042,015.

CROSS-REFERENCE

This application is the U.S. National Stage of International Application No. PCT/EP2015/067914 filed on Aug. 4, 2015, which claims priority to German patent application no. 10 2014 216 691.8 filed on Aug. 22, 2014.

TECHNOLOGICAL FIELD

The invention relates to a lubricant for rolling-element bearings, a rolling-element bearing including a lubricant, and a method of manufacture and repair of rolling-element bearings.

BACKGROUND

Bearings make possible the connecting of two objects while maintaining a rotational degree of freedom, with the result that the objects can perform a pivoting or rotation relative to each other. In rolling-element bearings this function is ensured by rolling elements that are rotatably retained between two raceways.

There are rolling-element bearings in axial as well as radial construction. Axial rolling-element bearings include a first bearing shell including a first raceway and a second bearing shell including a second raceway, wherein the bearing shells are rotatable relative to each other about a common axis of rotation that essentially corresponds to a surface normal of the bearing shells, and wherein the first raceway is disposed opposite the second raceway. Radial rolling-element bearings include an inner bearing ring including a radially outwardly facing first roadway and an outer bearing ring including a second raceway facing radially inward toward the inner bearing ring. An axis of rotation of the bearing extends through the centerpoint of the two bearing rings. To avoid losses due to friction as well as to extend the service life of a rolling-element bearing it is advantageous if the surfaces of the raceways as well as the rolling elements have a lowest-possible roughness.

For the manufacture of bearing components, such as, for example, bearing rings of rolling-element bearings including raceways for the rolling elements, raw material, e.g., tube- or rod-shaped raw material, e.g., made of 100Cr6, is initially processed into an annular blank by machining processes, such as, for example, turning or fine turning, or by forming processes such as forging, deep drawing, or rolling, and subsequently subjected to a heat treatment. A common heat treatment is three-stage and comprises, for example, austenitization at approximately 850° C., case-hardening at approximately 40° C., and quenching and tempering at approximately 170° C. In the following work areas the surfaces of the bearing ring or of the bearing disc are ground and optionally further smoothed by fine grinding, honing, and/or polishing.

Standard methods for manufacture of bearing rings or bearing discs have the disadvantage that to achieve low surface roughnesses very high production costs as well as long production times arise, since the work steps required therefor of fine grinding, honing, and/or polishing involve a special production expense.

Depending on usage type, rolling-element bearings are subject to more or less strongly pronounced wear since they make possible a relative movement involving friction of two objects. In particular with an eccentric or impulsive load as well as with use of too little lubricant or with ingress of hard foreign bodies into the rolling-element bearing, increased wear occurs on the rolling-element bearing. Due to wear, particles, for example, of the surfaces of the raceways and of the rolling elements are removed and thus the roughness of these surfaces is increased. This leads to an increased friction inside the rolling-element bearing between the raceways and the rolling elements, an increased frictional resistance, and to an increased heating as well as an increased wear of the rolling-element bearing. Starting at a certain degree of wear, rolling-element bearings must be repaired, or in the case of irreparable damage to rolling-element bearings, replaced.

According to conventional methods for repair of worn or damaged bearings, as a rule first the rolling-element bearing is disassembled, the lubricant removed, and the surfaces of the raceways or of the rolling elements are mechanically reworked, e.g., by polishing, in order to achieve a desired surface roughness. The rolling-element bearing is subsequently assembled again using fresh lubricant.

Known methods for the repair of worn or damaged rolling-element bearings have the disadvantage that in particular the mechanical processing of the surfaces is very time- or cost-intensive.

SUMMARY

It is an object of the present invention to improve a method for manufacture or repair of rolling-element bearings such that mechanical production methods such as, for example, honing, for achieving corresponding roughnesses of the surfaces of raceways and surfaces of the rolling elements are not required, and production costs are thus reduced.

Accordingly this object is inventively achieved by a lubricant for a rolling-element bearing including a conventional lubricant as base lubricant and at least one first additive, wherein the first additive includes muscovite and the lubricant has a proportion of muscovite that is between 3% and 5%.

Muscovite is a mineral from the mineral class of silicates and has the chemical structural formula:

$$KAl_2(AlSi_3O_{10})(OH,F)_2.$$

Compared to conventional lubricants, a lubricant including muscovite can have the advantage that during operation of the bearing muscovite penetrates into grooves and ridges of the bearing, e.g., of the bearing ring, of the bearing disc, or of the rolling element, and under influence of the operating forces arising in operation of the bearing enters into a bond with the bearing at these points and thus seals the grooves and ridges. In this way using an inventive lubricant surface roughnesses in the bearing are compensable and thus surfaces are achievable having such a low roughness that are otherwise only achievable by grinding- or honing-processes. By using such a lubricant such grinding- or honing-processes can therefore be eliminated and thus production times as well as production costs can be significantly reduced.

In other words, prior to the addition of the lubricant the rolling-element bearing can include raceways and/or rolling elements having an average roughness Ra, which is achievable with conventional milling or turning methods, and wherein due to the use of the lubricant a significant reduction of the average roughness is achieved to a value that is achievable, for example, by grinding or honing.

An exemplary embodiment of a lubricant is characterized by particularly advantageous EP properties (Extreme Pressure) as well as AW properties (Anti Wear). The lubricant forms chemical protective layers on the metal surfaces in the rolling-element bearing, which chemical protective layers are sheared off under extreme pressure (EP), whereby a fusing of the metal surfaces that can otherwise arise with high pressures is prevented. Furthermore the lubricant forms physical protective layers on the metal surfaces, which physical protective layers ensure a low coefficient of friction of the pairing of rolling elements and raceways and thus reduce the wear (AW) of the rolling-element bearing.

The lubricant includes a proportion of muscovite that is between 3% and 5%. Such a lubricant can have the effect that on the one hand sufficient muscovite is available for smoothing of surface roughnesses of the raceways and of the rolling elements, and on the other hand the muscovite is present in the lubricant in such a concentration that a lubricating function of the lubricant by the muscovite is not or only marginally influenced. An underdosage of the muscovite could cause a part of the to-be-sealed grooves or ridges of the raceways or of the rolling elements to remain unsealed due to a lack of muscovite. An overdosage could lead to increased friction in the bearing, since the muscovite can act in a similar manner to small, loose dirt particles.

Among other things the lubricant can be used for service in the food industry. Rolling-element bearings find use in many places in the food industry. Since a malfunction that leads to a contamination of food by a lubricant, e.g., due to a leakage of a bearing, can never be completely precluded, the lubricant used of a rolling-element bearing should be food-compatible. In addition, rolling-element bearings used in the food industry must as a rule have a lifetime lubrication, i.e., a rolling-element bearing must have a lubrication that ensures a proper operation of the rolling-element bearing until the replacement of the rolling-element bearing, so that in the meantime no lubricant replacement or no relubrication is required. Accordingly the lubricant used should have a long service life. Due to food compatibility conventional lubricants that are used in the food industry are hardly additized and thus have a low wear protection. Muscovite in lubricant acts as a food-compatible high-pressure additive and thereby makes possible a higher wear protection in comparison to conventional food-lubricants, and thereby extends the service life of the bearing.

Furthermore, according to some exemplary embodiments the object is achieved by a rolling-element bearing including a first raceway, a second raceway, and at least one rolling element disposed between the first raceway and the second raceway, and a lubricant, wherein the lubricant is an exemplary embodiment of a lubricant and thus includes muscovite as additive.

Moreover, the object is achieved by a method for the manufacture of rolling-element bearings including the steps: manufacturing of bearing rings or bearing shells including raceways and rolling elements, wherein the raceways and/or rolling elements have a surface having an average roughness value Ra between 1 μm and 12.5 μm, assembling of the bearing rings or bearing shells with the rolling elements, and introducing of a first lubricant into the rolling-element bearing, wherein the first lubricant is an inventive lubricant and includes muscovite as additive. Here the introducing of the first lubricant can occur before or after the assembling of the rolling-element bearing.

Compared to conventional methods for the manufacture of rolling-element bearings such a method has the advantage that only surfaces need to be produced by mechanical machining that have an average roughness value Ra between 1 μm and 12.5 μm. Such surfaces are achievable, for example, using conventional turning processes. Grinding processes are not required for this purpose. Due to the use of the lubricant these surface roughnesses are smoothed, e.g., during the operation of the rolling-element bearing, so that the surface roughnesses thereby achieved approximately correspond to those after a grinding or honing process and thus have an average roughness between approximately 0.01 and 0.4 μm. In this manner the manufacturing time and manufacturing costs are reduced.

Particularly preferably, after the introducing of the first lubricant a putting into operation of the bearing is effected for activation of the first lubricant. In the sense of the invention "activation of the first lubricant" means that the first lubricant is exposed to conditions that lead to a chemical and physical bonding of the muscovite to the corresponding grooves or ridges of the raceways or rolling-element surface of the rolling element, for example, by rotation of the bearing.

Subsequently the first lubricant can optionally be substantially replaced by a second lubricant. By replacing the first lubricant by a second lubricant it is achieved that the rolling-element bearing contains sufficient muscovite in the lubricant to penetrate into any damage of the surface appearing in the interior of the rolling-element bearing and to smooth by chemical and physical bonding.

The object is furthermore achieved by a method for repair of rolling-element bearings having worn surfaces of the raceways and/or rolling elements, including the step: introducing of a first lubricant into the rolling-element bearing to be repaired, wherein the first lubricant is an inventive lubricant and thus includes muscovite as additive. Compared to conventional methods, such a method for repair of rolling-element bearings has the advantage that mechanical post-processing steps, e.g., polishing, are omitted and thus the time required for a repair as well as the repair costs are considerably reduced.

The rolling-element bearing to be repaired is preferably disassembled and cleaned prior to the introducing of the first lubricant. It is thus ensured that old lubricant as well as dust and other foreign bodies present in the bearing are removed from the rolling-element bearing before the first lubricant is introduced. The quality of the repaired bearing is thereby further improved. According to the invention the introducing of the first lubricant can occur before and/or after an assembling of the rolling-element bearing.

BRIEF DESCRIPTION OF THE DRAWINGS

In the following the inventive method shall be described in more detail with reference to drawings. In the drawings.

DETAILED DESCRIPTION

Figure 1:
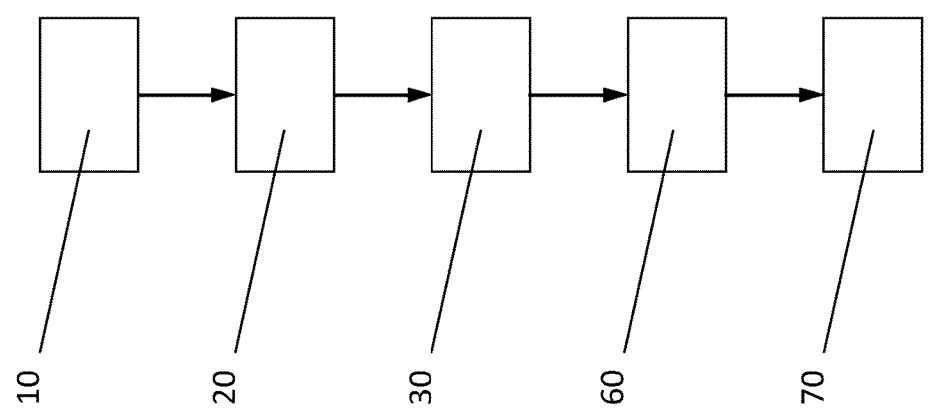
FIG. 1 shows a flow diagram of an embodiment of the inventive method for manufacture of a rolling-element bearing.

FIG. 1 shows a flow diagram of an embodiment of the inventive method of manufacture of a rolling-element bearing. In the first step, the manufacturing process 10, the individual components of the rolling-element bearing, such as, for example, bearing ring 1 or bearing shells including raceways 2, as well as rolling elements 6, are produced or provided. The raceways 2 and/or surfaces of the rolling elements 6 have a maximum average roughness of approximately 1 to 12.5 μm. In specific application cases the maximum average roughness can also be somewhat higher.

In the second step, the assembly process 20, the components of the rolling-element bearing are assembled. The first lubricant 4 that includes muscovite 5 as additive can be introduced into the bearing in a region between the raceways 2, wherein the rolling elements 6 are disposed, both during the assembly and also in the lubrication process.

In an optional fourth step, the putting-into-operation process 60, the rolling-element bearing is set in an operating state, i.e., the bearing-rings or -shells are set into rotation relative to each other. If necessary a further load is introduced into the rolling-element bearing in order to increase the load of the bearing. The goal of the putting-into-operation process 60 is to a achieve an operating state in the rolling-element bearing wherein the muscovite 5 in the lubricant 4 that is disposed in the recesses 3, such as, for example, grooves and ridges of the raceways 2 or of the surface of the rolling element 6, is activated and enters into a bond at these points with the recesses and thus smooths them.

In an optional fifth step, the exchange process 70, the first lubricant 4 is removed from the rolling-element bearing and replaced by a second lubricant 4 that also contains muscovite 5 as additive. In one exemplary embodiment a muscovite proportion of the second lubricant is lower than a muscovite proportion of the first lubricant.

Figure 2:
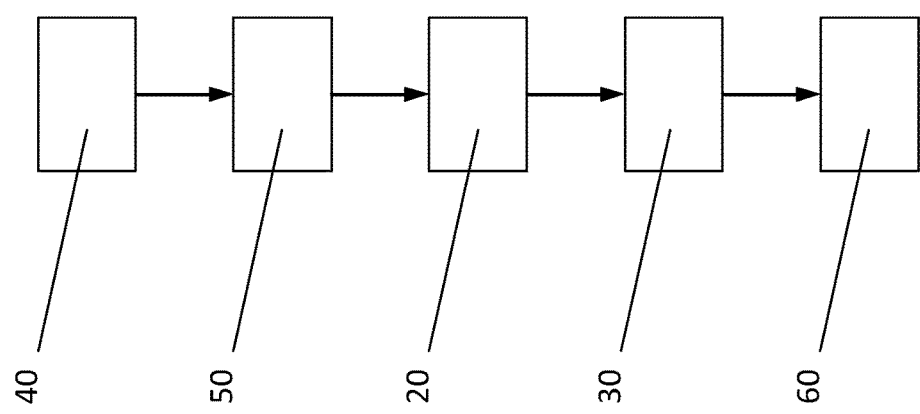
FIG. 2 shows a flow diagram of an embodiment of the inventive method for the repair of a rolling-element bearing.

FIG. 2 shows a flow diagram of an embodiment of the inventive method for repair of a rolling-element bearing. The rolling-element bearing is first disassembled in the disassembly process 40. The individual components of the disassembled rolling-element bearing are subsequently cleaned 50. In a subsequent assembly process 20 the cleaned components are assembled again. In a preferred embodiment of the method a first lubricant 4 that includes muscovite 5 is introduced into the rolling-element bearing in the assembly process 20 in a concurrently running lubrication process 30. Alternatively after the assembly process 20 the first lubricant 4 is introduced into the rolling-element bearing in a lubrication process 30. In an optional putting-into-operation process 60 the repaired rolling-element bearing is set into an operating state as already explained with reference to FIG. 1. According to the invention an optional exchange process not depicted in FIG. 2 can be provided as explained above with reference to FIG. 1.

Figure 3:
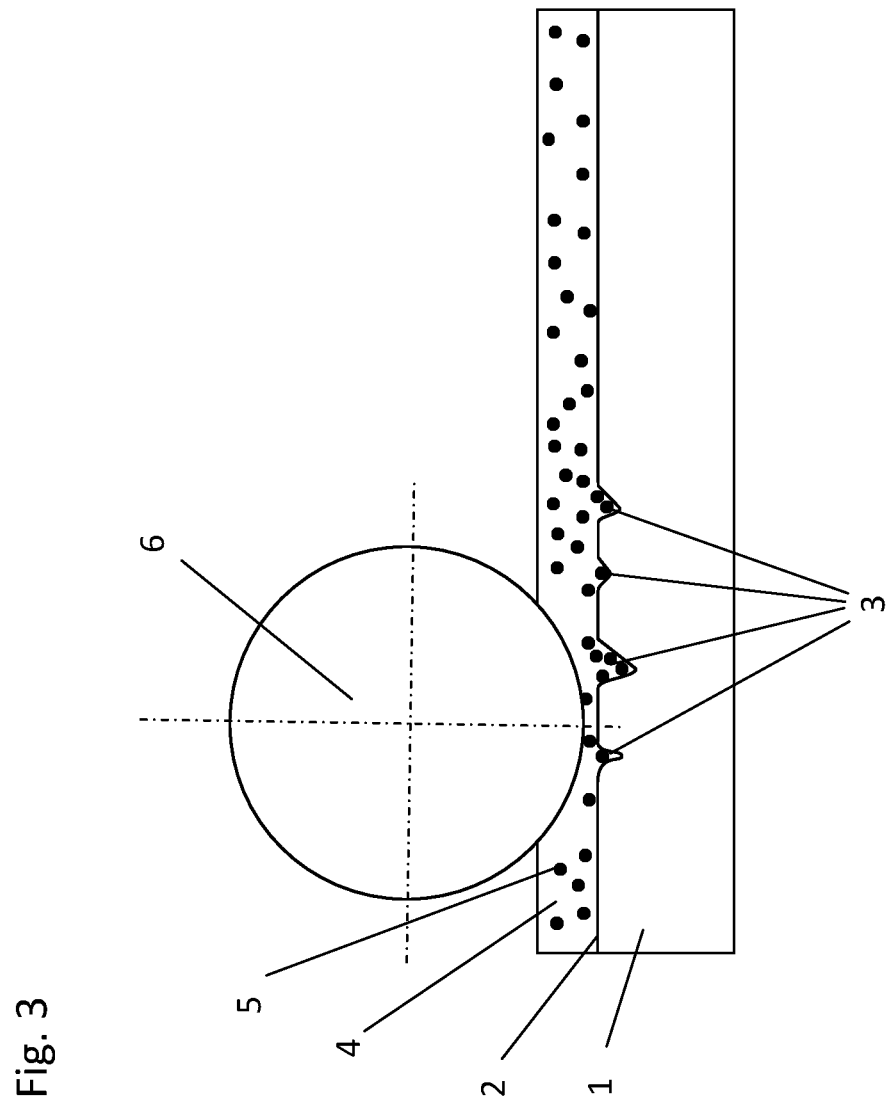
FIG. 3 shows a schematic depiction of the operating principle of muscovite as additive of a lubricant of a rolling-element bearing.

The operating principle of the muscovite as additive to the lubricant during the operation or the putting into operation 60 of the rolling-element bearing is schematically depicted in FIG. 3. FIG. 3 schematically shows a section of a bearing ring 1 of a rolling-element bearing. The bearing ring 1 includes a raceway 2 including a plurality of recesses 3 that are configured, for example, as grooves, ridges, or holes.

The raceway 2 includes a lubricant 4 including muscovite 5 as additive. During the operation or the putting into operation 60 of the rolling-element bearing the muscovite 5 is pressed by a rolling element 6, that is configured as a ball, for example, into the recesses 3. Due to the operating forces arising in operation the muscovite 5 in the recesses 3 reacts with the raceway 2 of the bearing ring 1 and is activated. The muscovite 5 thereby binds with the raceway 2 of the bearing ring 1 with the result that the recesses 3 are smoothed by the muscovite 5.

REFERENCE NUMBER LIST

1 Bearing ring
2 Raceway
3 Recesses
4 Lubricant
5 Muscovite
6 Rolling element
10 Manufacturing process
20 Assembly process
30 Lubrication process
40 Disassembly process
50 Cleaning process
60 Putting-into-operation process
70 Exchange process

The invention claimed is:

1. A rolling-element bearing comprising:
a first raceway,
a second raceway,
at least one rolling element disposed in a space between the first raceway and the second raceway, and
a lubricant comprising 3% to 5% muscovite in the space.

2. A rolling-element bearing according to claim 1, wherein the rolling-element bearing is configured for use in the food industry.

3. A method comprising:
providing a bearing comprising a first bearing element having a first raceway and a second bearing element having a second raceway and a plurality of rolling-elements between the first raceway and the second raceway, wherein a surface roughness Ra of the first raceway and/or a surface roughness Ra of the second raceway and/or a surface roughness Ra of the plurality of rolling elements is between 1 μm and 12.5 μm; and
introducing a first quantity of a lubricant comprising 3% to 5% muscovite into the bearing between the first raceway and the second raceway.

4. The method according to claim 3, wherein the first bearing element comprises a bearing ring or a bearing shell.

5. The method according to claim 3, including activating the lubricant by operating the bearing.

6. The method according to claim 5 removing a second quantity of the lubricant from the bearing and then adding a third quantity of the lubricant to the bearing.

7. A method for repairing a rolling-element bearing comprising introducing a lubricant comprising 3% to 5% muscovite into a space between a first raceway and a second raceway and between a first rolling element and a second rolling element of the rolling-element bearing.

8. The method according to claim 3, wherein introducing the first quantity of the lubricant into the bearing comprises introducing the first quantity of the lubricant into the bearing after the bearing is assembled.

* * * * *